Figure 1:
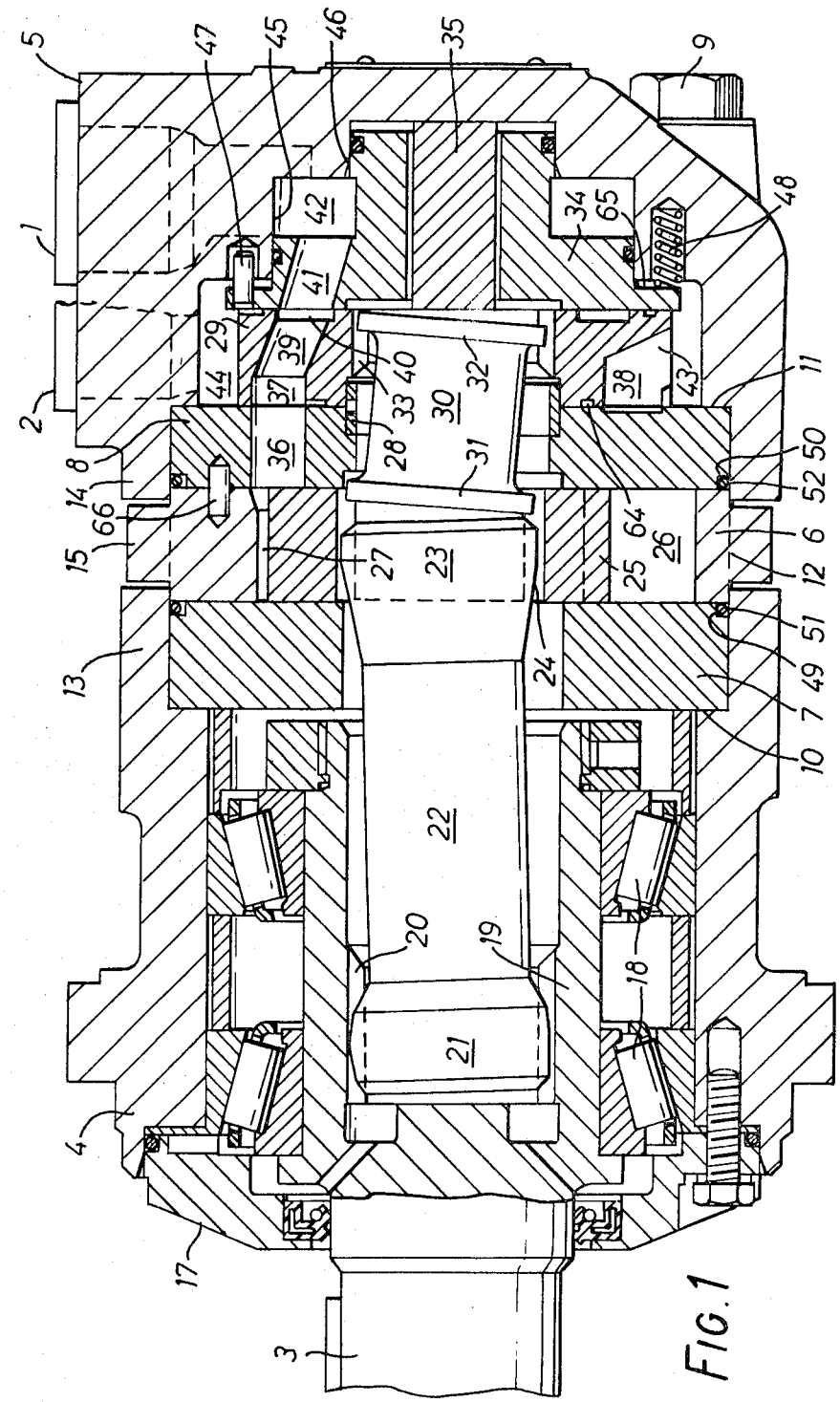

United States Patent
Hansen et al.

[11] 3,799,201
[45] Mar. 26, 1974

[54] DISTRIBUTOR VALVE FOR AN INTERNALLY SHAFTED ORBITAL PISTON MACHINE

[75] Inventors: Gunnar Lyshoj Hansen, Nordborg; Rolf Christensen, Sonderborg, both of Denmark

[73] Assignee: Danfoss A/S, Nordborg, Denmark

[22] Filed: Apr. 5, 1973

[21] Appl. No.: 348,300

[30] Foreign Application Priority Data
Apr. 26, 1972  Denmark.................. 22203505/72

[52] U.S. Cl................................ 137/625.21, 418/61
[51] Int. Cl............................................ F16k 11/02
[58] Field of Search................... 138/625.21–625.24;
418/54, 61, 75, 81

[56] References Cited
UNITED STATES PATENTS
3,572,983   3/1971   McDermott ........................ 418/61
3,680,987   8/1972   Ohrberg .............................. 418/61

Primary Examiner—Henry T. Klinksiek

[57] ABSTRACT

The invention relates to the distributor valve aspects of an internally shafted orbital piston machine. The distributor valve includes a fixed and movable valve part with the movable valve part being biased against the fixed valve part by an axially movable plunger. A central bearing bushing between the fixed and movable valve parts provides for precise centering of the movable valve. The fixed valve part is formed by brazing together two annular elements.

6 Claims, 5 Drawing Figures

DISTRIBUTOR VALVE FOR AN INTERNALLY SHAFTED ORBITAL PISTON MACHINE

The invention relates to a distributor valve for an internally shafted orbital piston machine which includes (a) a side disc which acts as a fixed valve part and which is held between housing parts clamped together by screw bolts, and (b) a valve disc connected to the rotor for rotation therewith.

In a known rotary piston machine (German patent application Ser. No. 1 931 144, as laid open) a disc shaped clamping housing part, a ring surrounding the valve disc, a side disc, a further intermediate disc and an outer stator are held together with the aid of clamping screw bolts. The valve disc rotates on a central bearing stud inserted in the clamping housing part. In this arrangement the side disc is centered with the aid of the clamping screw bolts, and the valve disc with the aid of the bearing stud.

The object of the present invention is to provide a distributor valve of the initially described kind in which very precise centering is achieved in a simple manner.

According to the invention this object is achieved in that the side disc carries in a central bore a bearing bush on which the rotating valve disc is mounted.

In this arrangement, the valve disc is located directly adjacent the disc by the bearing bush only. The two discs are therefore precisely centered in relation to each other. The bearing bush is located at a position where generally there is in any case an opening in the discs for an element, e.g., a universal joint shaft, for coupling the rotor with the valve disc. In this arrangement the bearing bush requires practically no additional space. Furthermore, the peripheral speed of the valve disc on the bearing bush is relatively low, since the periphery of the bearing bush is small. This is also true in the converse case when the bearing bush is pressed firmly into the valve disc and rotates in the side disc.

In a preferred arrangement, the side disc and the adjacent stator have the same diameter, and the peripheries are surrounded by a common axially projecting centring collar on one of the clamping housing parts. With the aid of the centering collar the stator and the side disc are directly centred in relation to each other. All three of the cooperating parts, i.e. the stator, the side disc and the valve disc, therefore occupy optimum positions in relation to each other.

It is also preferred to apply a pressure plate or plunger to the face of the valve disc that is remote from the side disc, which plunger is mechanically and/or hydraulically urged towards the discs. The valve disc is pressed tightly against the side disc with the aid of the plunger so that satisfactory functioning of the valve is achieved.

Where pressure responsive hydraulic loading of the plunger is used, the sealing force can be matched to the pressures against which a seal is to be provided.

The plunger is preferably centred by means of a surface of the said clamping housing part coaxially with the centering collar. The valve disc and plunger are thus precisely centred in relation to each other by the clamping housing part.

In a preferred arrangement, the valve disc has two sets of valve openings which alternately connect with the periphery and the opposite face of the valve disc, and distributor chambers adjacent the valve disc are separated from each other by an annular sealing surface on the said opposite face of the valve disc.

In this connection it is advantageous if an annular groove is provided on the side of the valve disc facing the side disc, which groove is connected to the valve openings which communicate with the opposite face. Consequently, the opposite face and the face of the plunger can be increased in size, and this permits the use of connecting hole cross sections that are correspondingly large and offer correspondingly reduced resistance to flow.

Particular advantage is achieved if an annular chamber communicating with one of the inlet/outlet ports is provided between the plunger and the said clamping housing part, which annular chamber leads by way of holes in the plunger to an annular groove between the plunger and the valve disc, said annular groove communicating by way of passages in the valve disc with the first set of valve openings.

Furthermore, an annular chamber communicating with the other inlet/outlet port may be provided at the periphery of the valve disc, which annular chamber communicates by way of passages in the valve disc with the second set of valve openings. This results in a very compact construction.

In a preferred arrangement the side disc and/or valve disc consist in each case of two annular elements brazed together, that element in each pair which faces the other of the discs having a greater inside diameter for accomodating the bearing bush. Quite complicated passages in such a disc can be formed with the aid of the two such annular elements. A particularly advantageous feature is that a precisely defined recess for accomodating the bearing bush is formed.

Further advantage accrues if the valve disc consists of two annular elements brazed together, one of these elements having valve openings in the form of radial grooves closed at both ends, and the other element having holes of diameter greater than the width of the radial grooves extending alternately from its periphery and face into the radial grooves.

In this connection it is preferred to produce the side disc and/or valve disc, in each case, from two annular elements of differing thickness, and to fit the thinner annular element on the side presented to the other of the discs. The mouths of the axial passages in the side disc and/or the valve openings in the valve disc can be formed very accurately in the thinner annular element by precision stamping.

Figure 2:
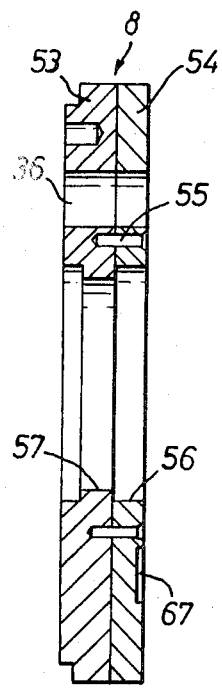
Figure 3:
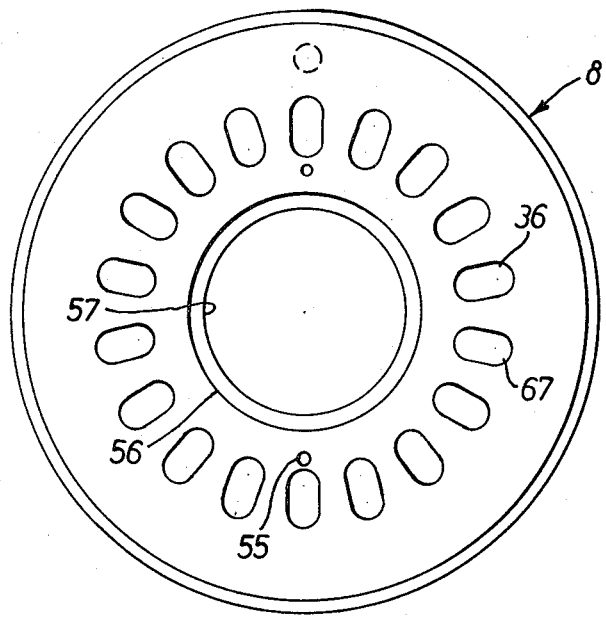
Figure 4:
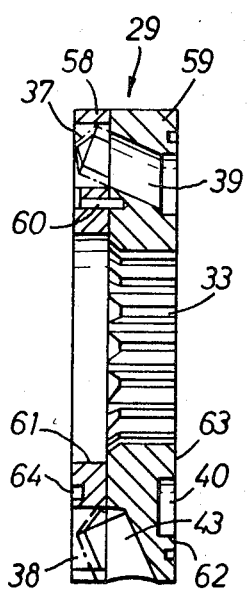
Figure 5:
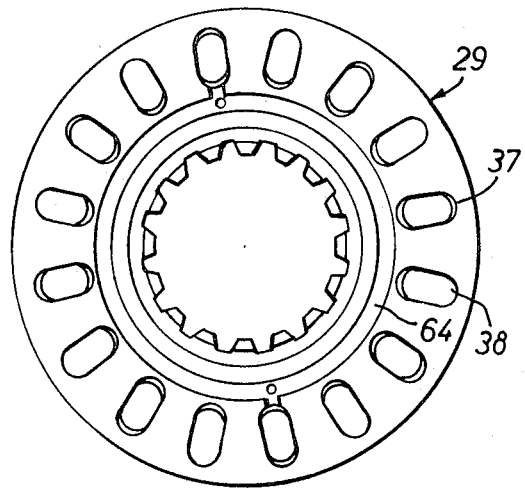

The invention will now be described in greater detail by reference to a preferred embodiment illustrated in the drawing, in which:

FIG. 1 shows a longitudinal section through an orbital piston machine in accordance with the invention, FIG. 2 shows a longitudinal section through a modified form of side disc, FIG. 3 is an elevation of this side disc, FIG. 4 shows a longitudinal section through a modified form of valve disc, and FIG. 5 is an elevation of this valve disc.

If the illustrated machine is to be used as a motor, then pressurized fluid is supplied to it selectively through one of the inlet/outlet ports 1 or 2 and low-pressure fluid is discharged through the other port, whilst driving power is taken from a shaft 3. If a drive is connected to the shaft 3, the machine can be used as a pump.

The housing has two clamping parts 4 and 5 between which are positioned an outer stator 6 and two side discs 7 and 8. When the two clamping housing parts 4 and 5 are drawn together with the aid of four clamping screw-bolts 9, the end faces 10 and 11 of these housing parts act on the side discs and the stator, and clamp these components firmly together. The stator 6 has a cylindrical periphery 12. The diameter of the stator and the diameters of the side discs 7 and 8 are the same. The housing part 4 has a centering collar 13 which extends, with sliding fit, over the periphery of the side disc 7 and the adjacent portion of the periphery 12 of the stator. The housing part 5 has likewise a centering collar 14 which extends, with sliding fit, over the periphery of the side disc 8 and the adjacent periphery 12 of the stator. The peripheral portion 12 of the stator carries a flange 15 of lesser width than the stator; this flange occupies the gap between the centring collars 13 and 14. The shanks of the clamping screw bolts 9 lie outwardly of the cylindrical periphery 12 of the stator 6, and holes or recesses are formed in the flange 15 to accomodate the shanks of the screw bolts.

The housing part 4 is closed at one end by a cover plate 17, and carries a double roller bearing 18 in which is mounted a hollow portion 19 of the shaft 3. In meshing engagement with a toothed (splined) portion 20 of this hollow shaft portion 19 is a toothed head 21 of a first 'universal joint' shaft 22, the opposite toothed head 23 of which meshes with a toothed portion 24 of a rotor 25 which takes the form of a toothed ring. Together with the teeth 26 of the stator, which here take the form of cylindrical inserts, the teeth of this rotor form displacement chambers 27 which, with the aid of a distributor valve, are connected in correct sequence to the ports 1 and 2 respectively.

For the purpose of forming the distributor valve, the side disc 8 supports, in an internal bore, a bearing bush 28 on which is mounted a rotating valve disc 29. This valve disc 29 is connected to, and so rotates with, the rotor 25 by way of a second 'universal joint' shaft 30, a first toothed head 31 of this universal joint shaft meshing with the toothed portion 24 of the rotor, and a second toothed head 32 meshing with a toothed portion 33 of the valve disc 29. A pressure plate or plunger 34 presses the valve disc 29 tightly against the side disc 8. A central stud 35 acts as an axial stop for the universal joint shaft 30 and prevents axial loads from being transmitted to the valve disc 29 or to the plunger 34.

The side disc 8 has axially extending passages 36 each of which is associated with the base of a tooth of the stator 6. The precise angular position of the disc is ensured by means of a pin 66. The valve disc 29 contains valve openings 37 which communicate indirectly with the port 1 and which alternate with valve openings 38 which communicate with the port 2. The number of valve openings is in each case equal to the number of teeth on the rotor 25. A passage 39 in the valve disc 29 extends from each valve opening 37 to an annular groove 40. This groove communicates with an annular chamber 42 by way of passages 41 in the pressure plate 34, the number of which passages 41 corresponds to the number of axially extending passages 36. The annular chamber 42 is formed between the clamping housing part 5 and the plunger 34, and communicates directly with the port 1. Each of the valve openings 38 communicates by way of an inclined passage 43 with an annular chamber 44 which surrounds the valve disc 29, and which communicates directly with the port 2.

The plunger 34 is guided on two concentric surfaces 45 and 46, and is prevented from rotating by a peg 47. The plunger is pressed in the axial direction against the valve disc 29 by one or more springs 48, and by the pressure obtaining in the annular chamber 42 and in the annular gap 65 associated with the annular chamber 44, so that the valve disc 29 is pressed tightly against the side disc 8.

That face of each of the side discs 7 and 8 that is presented to the stator 6 has a corner groove 49, 50 extending inwardly from the circumference of the disc, and a sealing ring 51, 52 is carried in each groove. These sealing rings prevent pressurized fluid from escaping across the faces between the stator 6 and the side discs 7 and 8; but they cannot themselves be displaced outwardly by the fluid pressure.

It will be seen from FIGS. 2 and 3 that a side disc 8 may consist of the annular elements 53 and 54, the element 53 being thicker than the element 54. These elements are held in position relatively to each other by means of pins 55 and are interconnected by brazing. The inside diameter 56 of the annular element 54 is greater than the inside diameter 57 of the annular element 53. Consequently a well defined recess for accomodating the bearing bush 28 is formed. Between each two adjacent axial passages 36 is a groove 67 of the same radial dimension for effecting equalization of pressure.

The valve disc 29 shown in FIGS. 4 and 5 again consist of annular elements 58 and 59, the element 58 being thinner than the element 59; these elements are held in position relatively to each other by means of pins 60 and are firmly interconnected by brazing. The inside diameter 61 of the annular element 58 is greater than the diameter of the toothed portion 33. It will also be seen that the valve openings 37 and 38 are stamped out in the annular element 58; these openings take the form of radial slots having parallel side walls which are interconnected at the inner and outer ends by arcuate portions. Prior to the brazing operation, only the annular groove 40 is formed in the annular element 59. The passages 39 and 43 are then drilled, the diameter being greater than the width of the valve openings 37 and 38 and the drill being inserted deeply into these valve openings in order to provide a path offering the least resistance to flow. An annular surface 62 on the face of the annular element 59 acts as a seal between the annular distributing groove 40 and the annular chamber 44. An annular face 63 acts as a seal between the annular distributing groove 40 and the inner cavity. An annular groove 64 on the opposite side communicates with the valve openings 37. This causes the effective pressure face of the annular chamber 42 to be increased. The cross sections of the bores 39 and 41 can be made correspondingly large so that they offer little resistance to flow.

We claim:

1. A rotary piston machine comprising a casing, a stationary disc shaped valve fixedly mounted in said casing, a rotatable disc shaped valve in abutting and relatively rotatable relation to said stationary valve, said valves having concentric counterbores in mutually adjacent relation to each other, a bearing bushing in said counterbores being fixedly attached to said stationary valve and being a journal for said rotatable valve.

2. A rotary piston machine according to claim 1 wherein said rotatable valve has an annular shaped bearing surface on the side thereof opposite said stationary valve, and an axially movable plunger in said casing in biasing engagement with said rotatable valve bearing surface for urging said rotatable valve towards said stationary valve.

3. A rotary piston machine according to claim 2 wherein said casing has concentric bores with one of said bores being a counterbore relative to the other of said bores, said plunger having stepped cylindrically shaped surfaces in respective bearing engagement with said bores.

4. A rotary piston machine according to claim 2 wherein said rotatable valve and said plunger form respectively with said casing first and second annularly shaped channels, said annular channels being separated by said bearing surface of said rotatable valve which is in sealing engagement with said plunger.

5. A rotary piston machine according to claim 4 including a first set of passages extending through said rotatable valve, and passages in said plunger providing fluid communication between said second annularly shaped channel and said first set of passages.

6. A rotary piston machine according to claim 1 wherein said stationary valve consists of two annularly shaped elements metallurgically attached together.

* * * * *